United States Patent
Huang et al.

(10) Patent No.: US 8,849,234 B2
(45) Date of Patent: Sep. 30, 2014

(54) DEVICE AND METHOD FOR CONTROLLING FREQUENCY RESONANCE POINT OF AN ANTENNA

(75) Inventors: Ching Her Huang, Tao Yuan County (TW); Liang-Hui Li, Tai Nan (TW)

(73) Assignee: Realtek Semiconductor Corp., Hsinchu (TW)

( * ) Notice: Subject to any disclaimer, the term of this patent is extended or adjusted under 35 U.S.C. 154(b) by 411 days.

(21) Appl. No.: 12/970,692

(22) Filed: Dec. 16, 2010

(65) Prior Publication Data
US 2011/0142178 A1    Jun. 16, 2011

(30) Foreign Application Priority Data
Dec. 16, 2009 (TW) .................... 98143051 A

(51) Int. Cl.
*H04B 1/16* (2006.01)
*H04B 1/18* (2006.01)

(52) U.S. Cl.
CPC ....................... *H04B 1/18* (2013.01)
USPC ....................... 455/334; 455/552.1

(58) Field of Classification Search
CPC .............. H04B 1/12; H04B 1/28; H04B 1/30; H04B 1/18; H04B 1/406; H04B 1/005; H04B 1/006; H03D 7/1433; B82Y 10/00
USPC ........ 455/334–336, 552.1–553.1, 193.1, 269, 455/275; 343/850, 702
See application file for complete search history.

(56) References Cited

U.S. PATENT DOCUMENTS

| | | | |
|---|---|---|---|
| 7,447,171 B2 * | 11/2008 | Smallcomb et al. ........ 455/277.1 |
| 7,714,787 B2 | 5/2010 | Adachi et al. | |
| 7,876,271 B2 * | 1/2011 | Nakanishi et al. ............ 343/702 |
| 8,106,848 B2 * | 1/2012 | Rofougaran .................. 343/860 |
| 2004/0268261 A1 * | 12/2004 | Elliott et al. .................. 715/716 |
| 2005/0253663 A1 | 11/2005 | Gomez et al. | |
| 2005/0276239 A1 | 12/2005 | Smallcomb et al. | |
| 2006/0018205 A1 * | 1/2006 | Liao et al. ........................ 369/18 |
| 2006/0279469 A1 * | 12/2006 | Adachi et al. .................. 343/767 |
| 2007/0142009 A1 * | 6/2007 | Scarpa et al. .................. 455/132 |
| 2007/0287400 A1 * | 12/2007 | Yu et al. ...................... 455/232.1 |
| 2008/0076353 A1 * | 3/2008 | Rofougaran ................. 455/41.2 |

(Continued)

FOREIGN PATENT DOCUMENTS

CN    1878254 A    12/2006

OTHER PUBLICATIONS

TW Office Action dated Jun. 21, 2013.
SIPO Office Action dated Apr. 1, 2014.

*Primary Examiner* — Lana N Le
(74) *Attorney, Agent, or Firm* — McClure, Qualey & Rodack, LLP

(57) ABSTRACT

The present invention disclosed an apparatus and method for receiving a plurality of broadcasting signals. The apparatus comprises: a control circuit for generating an analog control voltage signal according to a frequency-voltage look-up table and a desired frequency; an antenna module comprising an antenna and an antenna resonant control circuit comprising a voltage-controlled capacitor being controlled by the analog control voltage signal, wherein the antenna resonant control circuit comprises a voltage-controlled capacitor to control the bandwidth received by the antenna according to the analog control voltage signal; a tuner for tuning a broadcasting signal received by the antenna to generate an output signal; and a demodulator for demodulating the output signal of the tuner.

18 Claims, 3 Drawing Sheets

(56) References Cited

U.S. PATENT DOCUMENTS

| | | | |
|---|---|---|---|
| 2009/0058572 A1* | 3/2009 | Kim | 334/8 |
| 2010/0003942 A1* | 1/2010 | Ikeda et al. | 455/269 |
| 2010/0330908 A1* | 12/2010 | Maddern et al. | 455/41.2 |
| 2011/0001877 A1* | 1/2011 | Pugel | 348/565 |
| 2013/0084843 A1* | 4/2013 | Kim et al. | 455/418 |

* cited by examiner

US 8,849,234 B2

DEVICE AND METHOD FOR CONTROLLING FREQUENCY RESONANCE POINT OF AN ANTENNA

BACKGROUND OF THE INVENTION (a) Field of the Invention

The invention relates to a broadcasting system, particularly to a control circuit and related control method for controlling frequency resonance point of an antenna.

(b) Description of the Related Art

An FM/DAB (digital audio broadcasting)/SVB (digital video broadcasting) antenna needs a broad receiving bandwidth. For example, the bandwidth of FM is about 88 MHz-108 MHz, the bandwidth of DVB-T (European digital video broadcasting-Terrestrial) is about 177.5 MHz-226.5 MHz/474 MHz-858 MHz, and the bandwidth of DAB is about 1452 MHz-1491 MHz. Other antennas, such as WiMAX (Worldwide Interoperability for Microwave Access) and WLAN (Wireless Local Area Network) also have different receiving bandwidth.

Generally speaking, a prior single antenna cannot support such a Broad receiving bandwidth to include many kinds of broadcasting signals at the same time. If a plurality of antennas and a plurality of tuning units are used to receive different broadcasting signals separately to support a broad bandwidth, the total volume as well as the hardware cost are increased.

If an integrated antenna can receive a plurality of different broadcasting signals, such as an antenna integrating in-car broadcasting reception and wireless communication network, the production cost of the integrated antenna can be obviously reduced. However, such an integrated antenna may receive unnecessary signals due to its broad bandwidth to thereby result in difficulty in post-processing. Besides, how to control such an integrated antenna to receive a desired signal and achieve better reception quality is an important task to endeavor.

BRIEF SUMMARY OF THE INVENTION

In light of the above-mentioned problem, one object of the invention is to provide a control circuit for controlling frequency resonance point of an antenna and the related method to reduce the above problem in the prior art.

One object of the invention is to provide a control circuit for controlling frequency resonance point of an antenna and the related method to receive and process a plurality of different kinds of broadcasting signals.

One object of the invention is to provide a control circuit for controlling frequency resonance point of an antenna and the related method by an additional optimization procedure to achieve the purposes of simplifying circuitry, lowering cost, a better control effect by using the acquired information.

One embodiment of the invention provides a broadcasting signal receiving circuit, comprising: a control circuit, an antenna module, a tuner and a demodulator. The control circuit generates a voltage control signal according to a frequency-voltage look-up table and a desired frequency. The antenna module includes an antenna and an antenna resonant control circuit. The frequency range of the antenna covers at least two broadcasting frequency bands. The antenna resonant control circuit includes a voltage-controlled capacitor and adjusts the receiving bandwidth of the antenna according to the voltage control signal. The tuner is coupled to the antenna resonant control circuit and tunes a broadcasting signal received by the antenna to generate an output signal. The demodulator is coupled to the tuner and demodulates the output signal of the tuner.

DETAILED DESCRIPTION OF THE INVENTION

Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

Figure 1:
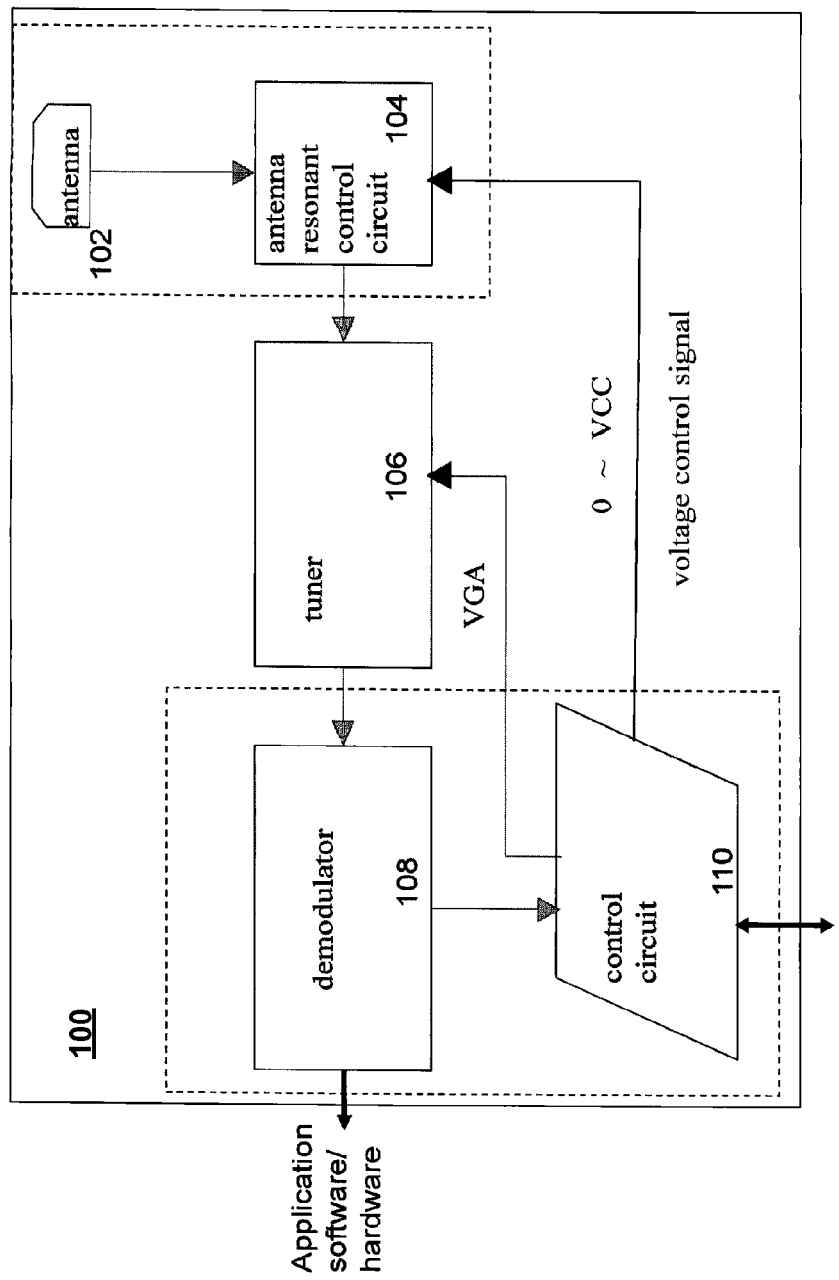
FIG. 1 shows a block diagram illustrating a broadcasting signal receiving circuit 100 according to a first embodiment of the invention.

FIG. 1 shows a block diagram illustrating a broadcasting signal receiving circuit 100 according to an embodiment of the invention. The broadcasting signal receiving circuit 100 includes an antenna 102, an antenna resonant control circuit 104, a tuner 106, a demodulator 108 and a control circuit 110. The broadcasting signal receiving circuit 100 may receive and process a plurality of broadcasting signals with different kinds of bandwidths, for example, at least two kinds of signals selected from the following standard: AM, FM, DVB, GSM, GPS, DCS, WiMAX and WLAN. The controllable frequency range should cover the bandwidths of any two of the above number of broadcasting signals to be received by the broadcasting signal receiving circuit 100. The control circuit 110 recognizes which broadcasting signal to be received according to a command from an upper layer to generate a control signal and then transmit to the antenna resonant control circuit 104 for controlling the received broadcasting signals. According to an embodiment, the antenna resonant control circuit 104 includes at least an LC tank and/or at least a voltage-controlled-capacitor. The voltage-controlled capacitor provides a corresponding capacitance according to the voltage value of the voltage control signal. The bandwidth of the broadcasting signal receivable by the antenna may be changed by adjusting the antenna resonant control circuit 104. Thus, the broadcasting signal within the bandwidth may be received and the unnecessary broadcasting signal may be rejected. In one embodiment, the antenna 102 and the antenna resonant control circuit 104 may be integrated into a circuit: "an antenna resonant control module". The antenna resonant control module adjusts the frequency resonance point of the antenna according to the voltage control signal. In the control circuit 110, a digital-to-analog converter (DAC) may be included to transform a digital control signal into the voltage control signal. Please note that, the voltage control signal is an analog signal described above. Those who are skilled in the art may directly replace the voltage control signal by a digital control signal to control the antenna resonant control circuit 104.

The tuner 106 may adjust settings of itself to perform gain recursion control according to control signals of the control circuit 110. The tuner 106 may be used to perform frequency conversion, filtering and/or amplification. Since the functions of the tuner 106 are well known to those who are skilled in the art, the operating principle and functions of the tuner 106 are not described hereinafter. In another embodiment, the tuner 106 may include a plurality of tuning units to separately process the broadcasting signals with different standards received by the antenna 102. In another embodiment, the control circuit 110 may output a variable gain amplifier control signal VGA to control the gain of the tuner 106.

The demodulator 108 may receive the output signal from the tuner 106 and demodulate the output signal. Since the functions of the demodulator 108 are well known to those who are skilled in the art, the operating principle and functions of the demodulator 108 are not be described hereinafter. The demodulator 108 transmits the demodulated signal to back-end circuits for subsequent processing, for example, application playing software and/or hardware. In another embodiment, the demodulator 108 may include a plurality of demodulation units to separately process the broadcasting signals with different standards outputted by the tuner 106. For example, if the demodulator 108 includes a DVB-T demodulation unit and a DAB demodulation unit, the broadcasting signal receiving circuit 100 may demodulate the DVB-T broadcasting signal and the DAB broadcasting signal.

The control circuit 110 may receive an external command (for example a command for receiving a DVB-T signal in a specific channel from a CPU or MCU) to determine the broadcasting signal received and processed by the broadcasting signal receiving circuit 100. The control circuit 110 may use the voltage control signal to adjust the antenna resonant control circuit 104 to reach functions of adjusting the frequency resonance point of the antenna. In another embodiment, assuming that the environment is under additive white Gaussian noise (AWGN) condition, a look-up table of the relation between the antenna resonance point and an initial voltage (of the analog voltage control signal) is built up in advance. Then, the control circuit 110 may perform related operations according to the look-up table to accelerate the above recursion control operation; certainly, it can also be omitted.

Figure 2:
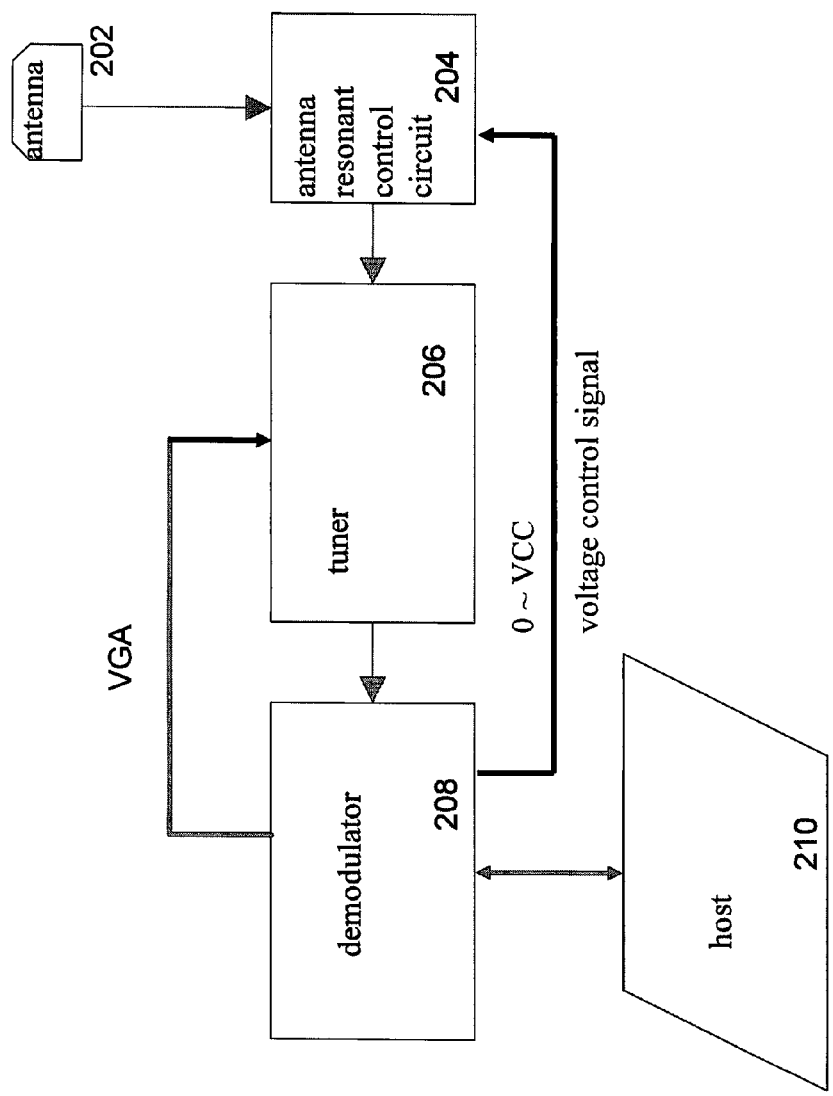
FIG. 2 shows a block diagram illustrating the integration of a broadcasting signal receiving circuit 200 and a host according to the first embodiment of the invention.

In another embodiment, the control circuit 110 may be set in the demodulator 108 within the same chip (for example, a DTV demodulator control chip), as shown in FIG. 2. FIG. 2 shows a block diagram illustrating the integration of a broadcasting signal receiving circuit 200 and a host according to the first embodiment of the invention. If the broadcasting signal receiving circuit 200 couples the host 210, the above mentioned look-up table may be set in a related driver. Thus, a user may command the playing software of the host to perform frequency change (for example, tuning to a different channel) and then the playing software transmits a frequency change command to the related driver such as a BDA driver (a BDA driver for a digital TV receiving chip applied in Microsoft Windows series where the related driver is not essential to the invention and the details of the related driver are well-known to those who are skilled in the art and thus omitted hereinafter). According to the built-in look-up table, the relation between the frequency and voltage is found so as to output the initial voltage. The initial voltage may be supplied to the antenna resonant control circuit 204 and the demodulator 208 performs recursion control according to an estimated signal-to-noise ratio. By the recursion control, a better control mechanism is achieved. Certainly, the control circuit 110 may be replaced by the computer CPU and related programs.

Figure 3:
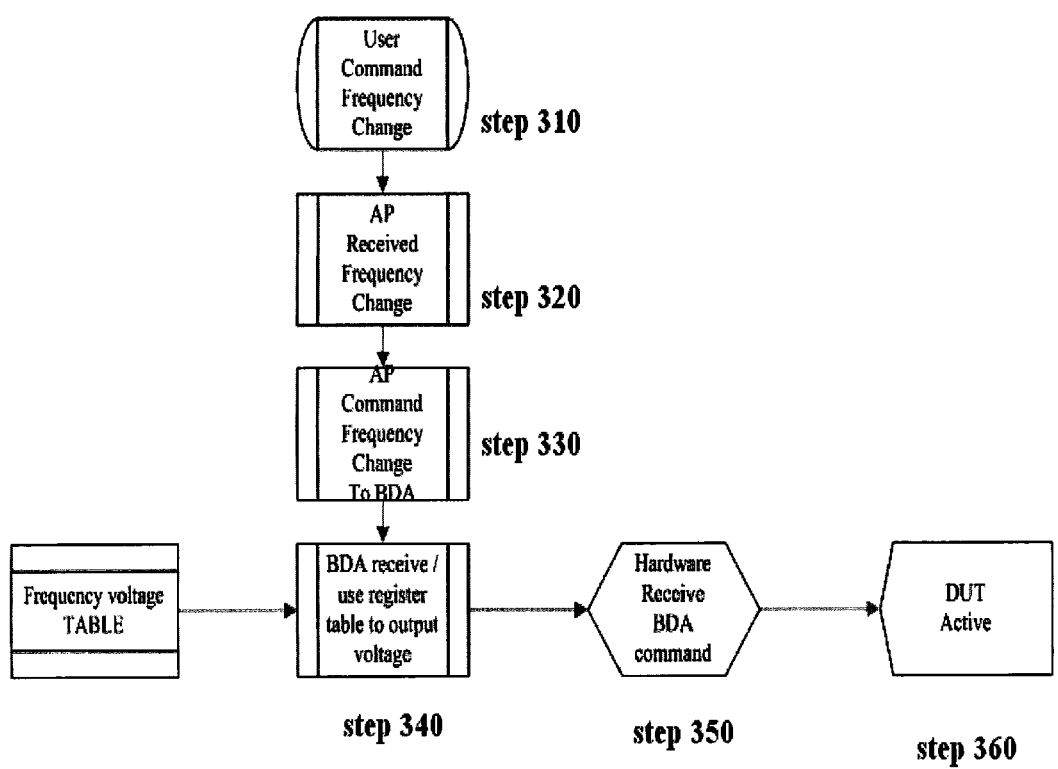
FIG. 3 shows a control flow chart illustrating the integration of the broadcasting signal receiving circuit 200 and the host.

FIG. 3 shows a control flow chart illustrating the integration of the broadcasting signal receiving circuit 200 and the host, comprising the following step:
Step 310: commanding the application software of the computer (playing software) by a user to perform frequency change (for example, tuning to a different channel);
Step 320: receiving the frequency change command by the software;
Step 330: sending the frequency change command to the related driver, such as a BDA driver;
Step 340: outputting a voltage control signal to the antenna resonant control circuit 104 according to a frequency-voltage look-up table and a desired frequency;
Step 350: receiving the related control command by the demodulator 208; and
Step 360: controlling the operations of the demodulator 208 and the tuner 206 by the control command, such as tuning to a different channel or the like and simultaneously performing recursion control by the demodulator 208 according to the estimated signal-to-noise ratio. If the above recursion control is performed, a better control mechanism can be achieved.

The invention provides a set of voltages to be used in antenna resonance point control to receive a plurality of different broadcasting signals to not only simplify circuitry and reduce cost but also achieve the optimum control mechanism by using the acquired information.

In one embodiment of the invention, for an application software (AP) using the FM/DAB/DTV system, after a user transmits a channel change command to a driver, the driver outputs a preset voltage according to the originally built-in frequency-voltage corresponding table. But, the preset voltage is built based on the assumption that the system is operating in a normal environment. Thus, the information acquired by the demodulator 208, such as signal-to-noise ratio (SNR), is used to change the output voltage to result in recursion control so as to achieve better control.

Certainly, the whole circuit can further comprise a low signal-to-noise ratio amplifier, disposed between the tuner 206 and the antenna resonant control circuit 204 to amplify the signal received by the antenna.

Although the present invention has been fully described by the above embodiments, the embodiments should not constitute the limitation of the scope of the invention. Various modifications or changes can be made by those who are skilled in the art without deviating from the spirit of the invention.

What is claimed is:

1. A broadcasting signal receiving circuit, comprising:
a control circuit, for outputting a voltage control signal according to a frequency-voltage look-up table and a desired frequency;
an antenna module, comprising an antenna and an antenna resonant control circuit wherein the controllable frequency range of the antenna covers at least two broadcasting frequency bands and the antenna resonant control circuit adjusts the frequency range received by the antenna according to the voltage control signal;
a tuner, coupled to the antenna resonant control circuit and tuning a broadcasting signal received by the antenna to generate an output signal, wherein the tuner comprises a plurality of tuning units for separately processing broadcasting signals received by the antenna, the plurality of tuning units corresponding to different standards; and
a demodulator, coupled to the tuner and demodulating the output signal of the tuner, wherein the control circuit receives a command originating in an application layer, the command specifying a desired broadcasting signal in a specific channel to be received and processed by the broadcasting signal receiving circuit, wherein the control circuit controls the antenna module to adjust frequency resonance point of the antenna in response to the command.

2. The circuit according to claim 1, wherein the antenna resonant control circuit comprises one of the following or combination thereof: at least a voltage-controlled capacitor and at least a LC tank.

3. The circuit according to claim 2, wherein the voltage-controlled capacitor receives a voltage control signal and then provides a corresponding capacitance according to the magnitude of the voltage control signal to change a frequency band received by the antenna for receiving a broadcasting signal in the frequency band and excluding a broadcasting signal outside the frequency band.

4. The circuit according to claim 1, wherein the voltage control signal is an analog voltage control signal and comprises a digital-to-analog converter to convert a digital signal into the analog voltage control signal.

5. The circuit according to claim 1, wherein the voltage control signal is a digital voltage control signal to control the antenna resonant control circuit.

6. The circuit according to claim 1, wherein the tuner further receives another control signal of the control circuit to adjust setting of the tuner to have the tuner perform gain recursion control.

7. The circuit according to claim 1, wherein the control circuit further outputs a gain control signal to control the gain of the tuner.

8. The circuit according to claim 1, wherein the demodulator comprises a plurality of demodulation units to separately process the output signal of the tuner.

9. The circuit according to claim 1, wherein the table of the control circuit is built based on the relation between the frequency resonance point of the antenna and the voltage control signal under the condition that it is assumed to be under additive white Gaussian noise (AWGN) condition.

10. The circuit according to claim 1, wherein the control circuit and the demodulator are disposed in one chip.

11. The circuit according to claim 1, wherein the control circuit is a central processing unit (CPU).

12. The circuit according to claim 1, further comprising: a low-noise amplifier, coupled to the antenna resonant control circuit to amplify a signal received by the antenna.

13. The circuit according to claim 1, wherein the demodulator estimates a signal-to-noise ratio of the broadcasting signal to adjust the voltage control signal to perform recursion control to the antenna resonant control circuit, the tuner, and the demodulator.

14. A method for processing broadcasting signals, comprising:
receiving a command by a playing application, wherein the command corresponds to a desired frequency;
outputting a voltage control signal according to a frequency-voltage look-up table and the desired frequency;
adjusting a bandwidth received by an antenna according to the voltage control signal; and
using a tuner and a demodulator to process the broadcasting signal received by the antenna, wherein the tuner comprises a plurality of tuning units for separately processing broadcasting signals received by the antenna, the plurality of tuning units corresponding to different standards.

15. The method according to claim 14, wherein the voltage control signal is used to change one resonance point of an antenna resonant control circuit of the antenna to change a frequency range received by the antenna to adjust the bandwidth received by the antenna.

16. The method according to claim 14, wherein the demodulator estimates a signal-to-noise ratio of the broadcasting signal to adjust the voltage control signal to perform recursion control to the antenna resonant control circuit, the tuner, and the demodulator.

17. The method according to claim 14, wherein the voltage control signal is used to control frequency resonance point of the antenna to receive a plurality different broadcasting signals corresponding to the different standards.

18. A broadcasting signal receiving circuit, comprising:
a control circuit for receiving a user command selecting a desired frequency and outputting a voltage control signal according to a frequency-voltage look-up table and the desired frequency;
an antenna module comprising an antenna and an antenna resonant control circuit, wherein the controllable frequency range of the antenna covers a plurality of broadcasting frequency bands each corresponding to a different standard, and wherein the antenna resonant control circuit adjusts the frequency range received by the antenna according to the voltage control signal;
a tuner, coupled to the antenna resonant control circuit, for tuning a broadcasting signal received by the antenna to generate an output signal, wherein the tuner comprises a plurality of tuning units for separately processing broadcasting signals received by the antenna, the plurality of tuning units corresponding to different standards; and
a demodulator, coupled to the tuner and demodulating the output signal of the tuner,
wherein the control circuit receives the user command via a playing application, wherein the command generated by the user via the playing application corresponds to a channel tuning selection, and wherein based on the command, a frequency resonance point of the antenna is adjusted.

* * * * *